United States Patent

[11] 3,580,075

| [72] | Inventor | David R. Steinberg |
| | | Raleigh, N.C. |
| [21] | Appl. No. | 657,370 |
| [22] | Filed | July 31, 1967 |
| [45] | Patented | May 25, 1971 |
| [73] | Assignee | Corning Glass Works |
| | | Corning, N.Y. |

[54] PRESSURE TRANSDUCER FOR IONIZABLE FLUIDS
11 Claims, 5 Drawing Figs.

[52] U.S. Cl. .................................................. 73/339,
324/33, 73/36.2
[51] Int. Cl. .......................................................... B21d 28/00
[50] Field of Search............................................ 324/30, 30
(B), 33, 65 (P); 73/398, 362, 339, 357; 179/121;
137/81.5; 313/356, 231, (Inquired)

[56] References Cited
UNITED STATES PATENTS

| Re23,368 | 5/1951 | Grob et al. ...................... | 324/79X |
| 1,534,148 | 4/1925 | Vogt et al. ...................... | 179/121 |
| 1,543,736 | 6/1925 | Thomas............................ | 73/398X |
| 1,690,255 | 11/1928 | Snook ............................. | 179/121 |
| 1,923,889 | 8/1933 | Sauter.............................. | 324/30X |
| 2,204,196 | 6/1940 | Straatman....................... | 324/30X |
| 2,323,317 | 7/1943 | Dunmore et al. ............... | 324/33 |
| 2,452,615 | 11/1948 | Thomson......................... | 324/30X |
| 2,739,478 | 3/1956 | Offner............................. | 324/33X |
| 3,101,239 | 8/1963 | Warren et al. .................. | 324/30X |
| 3,411,073 | 11/1968 | Marr ............................... | 324/33 |
| 2,652,497 | 9/1953 | Miller.............................. | 73/362X |
| 3,451,269 | 6/1969 | Johnson .......................... | 73/357X |

Primary Examiner—Rudolph V. Rolinec
Assistant Examiner—R. J. Corcoran
Attorneys—Clarence R. Patty, Jr. and Walter S. Zebrowski ABSTRACT: A pressure transducer for ionizable fluids having no vibrating or moving parts and capable of reliable operation at high ambient temperatures is disclosed. The driving fluid to be detected is introduced into a space between a pair of electrodes across which an ionizing electrical potential exists. Ionic current flow between the transducer electrodes is a function of the instantaneous density of the driving fluid within the interelectrode space and produces corresponding current and voltage drops in an external circuit of sufficient intensity to drive detectors, amplifiers, or a variety of electrical instruments.

INVENTOR.
DAVID R. STEINBERG
BY Walter S. Zabrowski
ATTORNEY 3,580,075

PRESSURE TRANSDUCER FOR IONIZABLE FLUIDS

BACKGROUND OF THE INVENTION

Development and adaptation of fluidic components for use in high temperature environments, notably those exceeding 500° C. has produced the need for a reliable high temperature pressure transducer. The desirability of such a device is illustrated in my copending application entitled, "A SYSTEM FOR MEASURING TEMPERATURE," Ser. No. 589,367 filed Oct. 25, 1966 now U.S. Pat. No. 3,427,881. In that application a fluid pressure oscillator temperature sensor operating in temperature ranges up to 1,700° C. and beyond is disclosed. The system therein described contemplates the positioning of a pressure transducer directly within the high temperature environment of the fluid oscillator package.

Conventional pressure transducers well known in the art are ordinarily of the piezoelectric type employing mechanically vibrating members such as quartz crystals, metallic diaphragms or membranes, and the like which are either actuated by or used to produce corresponding electrical signals. These mechanically vibrating members often limit the maximum temperatures at which piezoelectric devices can function reliably.

SUMMARY OF THE INVENTION

It is an object of the instant invention to achieve a fluid pressure transducer device which functions reliably at high ambient temperatures.

It is a further object of this invention to improve the reliability of pressure transducer devices through elimination of mechanically vibrating members and other moving parts.

It is still another object of this invention to provide a dynamic pressure transducer with high fluid frequency response capabilities.

Briefly, in accordance with the instant invention, two electrodes are adapted to provide an interelectrode space between them into which an ionizable fluid, supplied from an external source, is introduced as desired and thereafter exhausted. An ionizing potential difference is applied across the electrodes from an external voltage source producing ion and electron current flow between the electrodes which is proportional to the density of the fluid in the interelectrode space. An external circuit containing the electrode potential source and a resistance or resonant circuit connected between the electrodes permits external circuit current flow and voltage drops which correspond to the magnitude and variations of the driving fluid density. These external voltage drops and currents can be used to drive amplifiers, detectors, and the like or can be sensed with a variety of electrical instruments such as frequency counters, oscilloscopes, and the like.

Additional objects, features and advantages of the instant invention will become apparent to those skilled in the art, from the following detailed description and attached drawing, on which, by way of example, only the preferred embodiments of the instant invention are illustrated.

DESCRIPTION OF THE PREFERRED EMBODIMENTS

Figure 1:
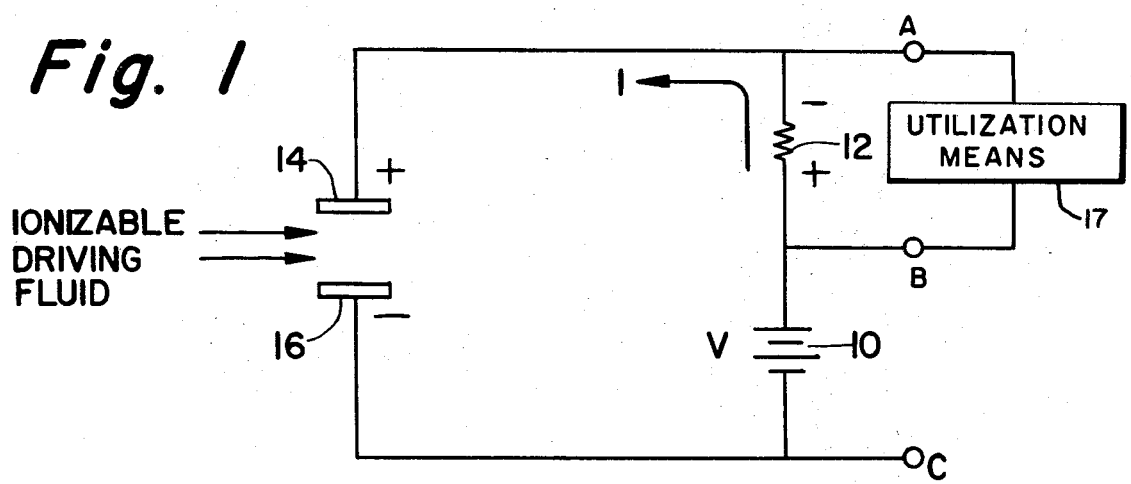
FIG. 1 is a schematic diagram of an electrical circuit embodying the pressure transducer of the instant invention.

Referring to the schematic diagram of FIG. 1 a voltage source 10 and a resistance 12 are connected in series across two transducer electrodes 14 and 16. An ionizable driving fluid such a helium, air, or the like is introduced into the space between the electrodes 14 and 16 as indicated by arrows in FIG. 1 by placing the transducer in the driving fluid atmosphere, by injecting the fluid from a nozzle, or other suitable means well known in the art, not shown. The electrode potential generated by the voltage source 10 may be of any value sufficient to ionize the particular driving fluid in use. Due to a potential gradient existing within the interelectrode space the resulting ions and electrons created produce current flow between the electrodes 14 and 16. This current is proportional to the instantaneous value of the driving fluid density within the interelectrode space and produces a corresponding current flow in the external circuit containing the electrode potential source 10 and the resistance 12. The resulting voltage appearing across the resistor 12 as indicated in FIG. 1 between points A and B is one means of obtaining an output signal from the transducer whose electrical properties such as amplitude, frequency, waveform, magnitude, and the like may be detected, measured, or sensed by various electrical instruments such as detectors, amplifiers, frequency counters, oscilloscopes, and the like.

Figure 3:
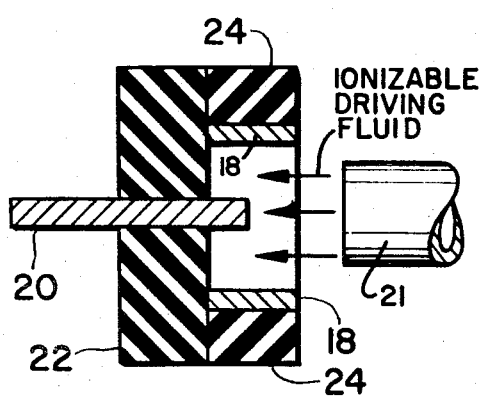
FIG. 3 illustrates a cross-sectional view of the pressure transducer shown in FIG. 2 taken along line 3-3 thereof.
Figure 2:
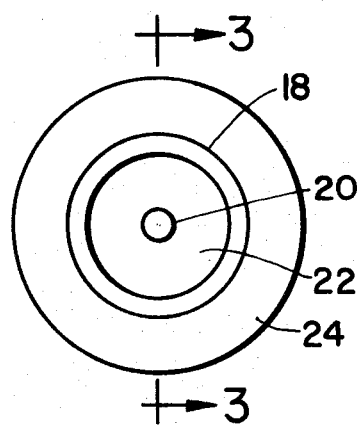
FIG. 2 is an end view of a cylindrically shaped pressure transducer illustrating one embodiment of the instant invention.

FIGS. 2 and 3 illustrate one particular form of construction which the pressure transducer of the instant invention may take consisting of a hollow cylindrical electrode 18 and a solid cylindrical electrode 20. The solid electrode 20 is rigidly supported by a supporting disc 22 such that its longitudinal axis coincides with the longitudinal axis of the hollow electrode 18 and protrudes a suitable depth into the hollow electrode 18. The hollow electrode 18 is held in position by a supporting disc 24 having a circular hole through its center whose diameter is such that the hollow electrode 18 is supported securely therein. The circular hole in supporting disc 24 with the hollow electrode 18 secured therein also provides the means whereby by the eternally supplied driving fluid is admitted into the interelectrode space as desired and thereafter exhausted. The two supporting discs 22 and 24 are bonded together by any suitable means well known in the art. The fluid is introduced into the space between the electrodes 18 and 20 as indicated by arrows in FIG. 3 by placing the transducer within the fluid atmosphere, by injecting the fluid from a nozzle, or by any suitable means well known in the art, not shown.

The supporting discs 22 and 24 are composed of material possessing suitable dielectric and mechanical strength and having suitable heat resistant quality for the temperature levels to which the transducer is subjected. At moderate temperature levels plexiglass, glass, and the like are satisfactory. At higher temperature levels refractory materials such as porcelain, ceramic substances and the like should be used.

Figure 4:
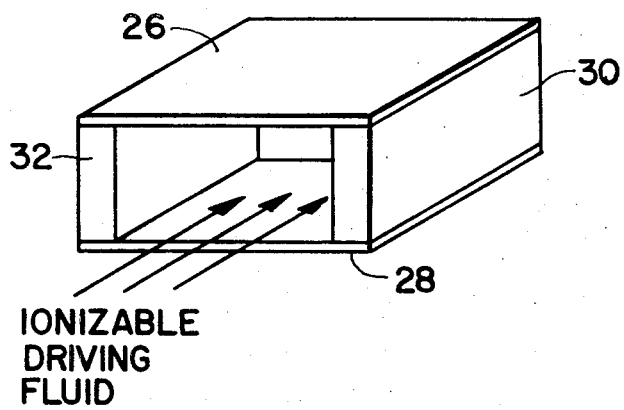
FIG. 4 is an oblique view of a pressure transducer having parallel plate electrodes illustrating another embodiment of the instant invention.
Figure 5:
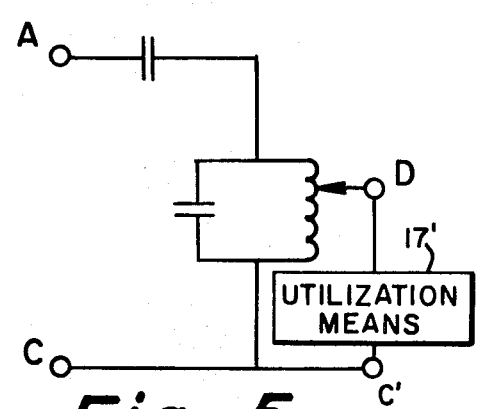
FIG. 5 is a schematic diagram of one type of electrically resonant circuit which may be used with the pressure transducer of the instant invention to aid in the detection of high frequency output signals.

FIG 4 shows shape which the pressure transducer of the instant invention may take consisting of parallel plate electrodes 26 and 28 spaced a suitable distance apart by insulating supporting members 30 and 32. The ionizable driving fluid, indicated by arrows, is introduced into the space between the electrodes 26 and 28 by any suitable means well known in the art, not shown. It should be noted that the driving fluid passes through one side of the transducer, between the plates 26 and 28, and exhausts out the opposite side. However, the transducer could just as well be closed off on the opposite side thus forming a cavity between the electrodes having only a single opening through which the fluid is both introduced and thereafter exhausted. Where the mechanical vibration rate of the driving fluid is high the electrical output signal of the transducer may be of such high frequency that a resonant circuit, such as the one illustrated in FIG. 5, should be used in place of the resistor 12 in FIG. 1. One means of accomplishing this is to connect terminals A and C of the circuit in FIG. 5 to the corresponding terminals of the circuit shown in FIG. 1. In such cases resistor 12 may be retained in the circuit as a current limiting device but the output signal of the transducer is taken from the resonant circuit in FIG. 5 between the points C' and D.

I claim:

1. In a system for determining the temperature of a high temperature region, said system being of the type wherein a high temperature ionizable gas is directed to a fluid oscillator which causes said fluid to vibrate, the frequency of said vibrations being related to the temperature of said gas, and wherein a transducer converts said vibrations into an electrical signal, said transducer being characterized in that it comprises
   first and second electrodes,
   means for supporting said electrodes in such a manner that they are spaced with respect to one another,
   means for providing an electrical potential difference between said electrodes, and
   output means for providing an indication of the electrical currents flowing between said electrodes.

2. The system of claim 1 wherein said first electrode consists of a cold cathode and said second electrode consists of an anode and wherein said supporting means consists of a refractory material capable of withstanding high temperatures.

3. The system of claim 2 wherein said output means comprises a resistor connected in series with said electrodes and said electrical potential means, and utilization means connected in parallel with said resistor.

4. The system of claim 2 wherein said output means comprises
   a resistor in series with said electrodes and said electrical potential means,
   a parallel L-C tuned circuit adapted to resinate at the frequency of said electrical currents, connected between said electrodes, and
   utilization means connected to said tuned circuit for sensing at least one desired electrical property of the voltage developed across said tuned circuit.

5. The system of claim 1 wherein said pair of electrodes comprise
   a hollow cylindrically shaped electrode, and
   a solid cylindrically shaped electrode, at least a portion of which projects into said hollow electrode, the longitudinal axis of which coincides with the longitudinal axis of said hollow electrode, and the diameter of which is less than the inside diameter of said hollow electrode.

6. The system of claim 1 wherein said pair of electrodes comprise parallel plates.

7. A pressure transducer for high temperature ionizable fluids comprising
   a nonconductive disc,
   a solid cylindrical electrode extending through said disc and protruding beyond at least one surface of said disc, the longitudinal axis of said solid electrode coinciding with that of said disc,
   a hollow cylindrical electrode surrounding that portion of said solid electrode which protrudes from said disc, one end of said hollow electrode contacting said disc,
   said electrodes being separated by a gap,
   said ionizable fluid entering the end of said hollow cylinder opposite that which is in contact with said disc.

8. The pressure transducer of claim 7 which further includes a flanged portion extending from said disc, said hollow cylindrical electrode being securely supported within said flanged portion.

9. The pressure transducer of claim 8 wherein said solid cylindrical electrode constitutes a cold cathode, said hollow cylindrical electrode consists of an anode, and wherein said disc and said flanged portion consists of a refractory material capable of withstanding high temperatures.

10. The pressure transducer of claim 9 which further comprises a voltage source and a resistor connected in series, the combination of which is connected across said hollow and said solid electrodes, and means connected to said resistor for detecting electrical currents flowing therethrough.

11. The pressure transducer of claim 10 wherein said means for detecting electrical currents flowing through said resistor comprises
   a parallel L-C tuned circuit adapted to resonant at the frequency of said electrical currents, connected in parallel with said resistor, and
   utilization means connected to said tuned circuit for sensing at least one desired electrical property of the voltage developed across said tuned circuit.